US012724902B2

(12) United States Patent
Gwilliams et al.

(10) Patent No.: US 12,724,902 B2
(45) Date of Patent: Sep. 1, 2026

(54) AUTOMATED MACHINE LEARNING MODEL ASSESSMENT

(71) Applicant: Saudi Arabian Oil Company, Dhahran (SA)

(72) Inventors: John Gwilliams, Dhahran (SA); Sultan Saadaldean Alsharif, Dammam (SA); Abdulmalik Abdulaziz Aljurayyad, Dammam (SA); Eidan K. Aleidan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 113 days.

(21) Appl. No.: 18/755,902

(22) Filed: Jun. 27, 2024

(65) Prior Publication Data

US 2026/0003971 A1 Jan. 1, 2026

(51) Int. Cl.
*G06F 21/57* (2013.01)
*G06N 20/00* (2019.01)

(52) U.S. Cl.
CPC .......... *G06F 21/577* (2013.01); *G06N 20/00* (2019.01); *G06F 2221/033* (2013.01)

(58) Field of Classification Search
CPC .. G06F 21/577; G06F 2221/033; G06N 20/00
See application file for complete search history.

(56) References Cited

U.S. PATENT DOCUMENTS

| | | | | |
|---|---|---|---|---|
| 11,775,867 | B1 * | 10/2023 | Jamei | H04L 63/10 706/12 |
| 2020/0264969 | A1 * | 8/2020 | Tu | G06F 11/3688 |
| 2021/0287050 | A1 * | 9/2021 | Kar | G06V 10/776 |
| 2024/0045957 | A1 | 2/2024 | Alasmari et al. | |
| 2024/0273395 | A1 * | 8/2024 | Devaraj | G06N 20/00 |

OTHER PUBLICATIONS

A Test Architecture for Machine Learning Product (Year: 2018).*
Testing Framework for Blackbox AI Models (Year: 2021).*
Aistandardshub.org [online], "Recommended Practice for Vulnerability Test for Machine Learning Models for Computer Vision Applications," retrieved on Oct. 3, 2024, retrieved from URL <https://aistandardshub.org/ai-standards/recommended-practice-for-vulnerability-test-for-machine-learning-models-for-computer-vision-applications/>, 6 pages.

(Continued)

*Primary Examiner* — Shirley X Zhang
(74) *Attorney, Agent, or Firm* — Dinsmore & Shohl LLP

(57) ABSTRACT

The present disclosure relates to computer-implemented methods, software, and systems for security testing of machine learning (ML) models. A request is received to perform a security test on a first ML model, wherein the request comprises a file with the first ML model. The first ML model is analyzed to identify a type of the first ML model. Applicable test cases are generated for testing the first ML model. The applicable test cases are executed to determine a model assurance score indicative of an ability of the first ML model to withstand adversarial attacks. A report is provided for display at a display device, the report comprising the model assurance score for the first ML model.

20 Claims, 5 Drawing Sheets

(56) References Cited

OTHER PUBLICATIONS

Nightfall.ai [online], “Robustness Testing, ” retrieved on Oct. 3, 2024, retrieved from URL <https://www.nightfall.ai/ai-security-101/robustness-testing#:~:text=Robustness%20testing%20works%20by%>, 7 pages.

Stackoverflow.blog [online], “AI applications open new security vulnerabilities,” retrieved on Oct. 3, 2024, retrieved from URL <https://stackoverflow.blog/2023/01/24/ai-applications-open-new-security-vulnerabilities/, 10 pages.

* cited by examiner

FIG. 3
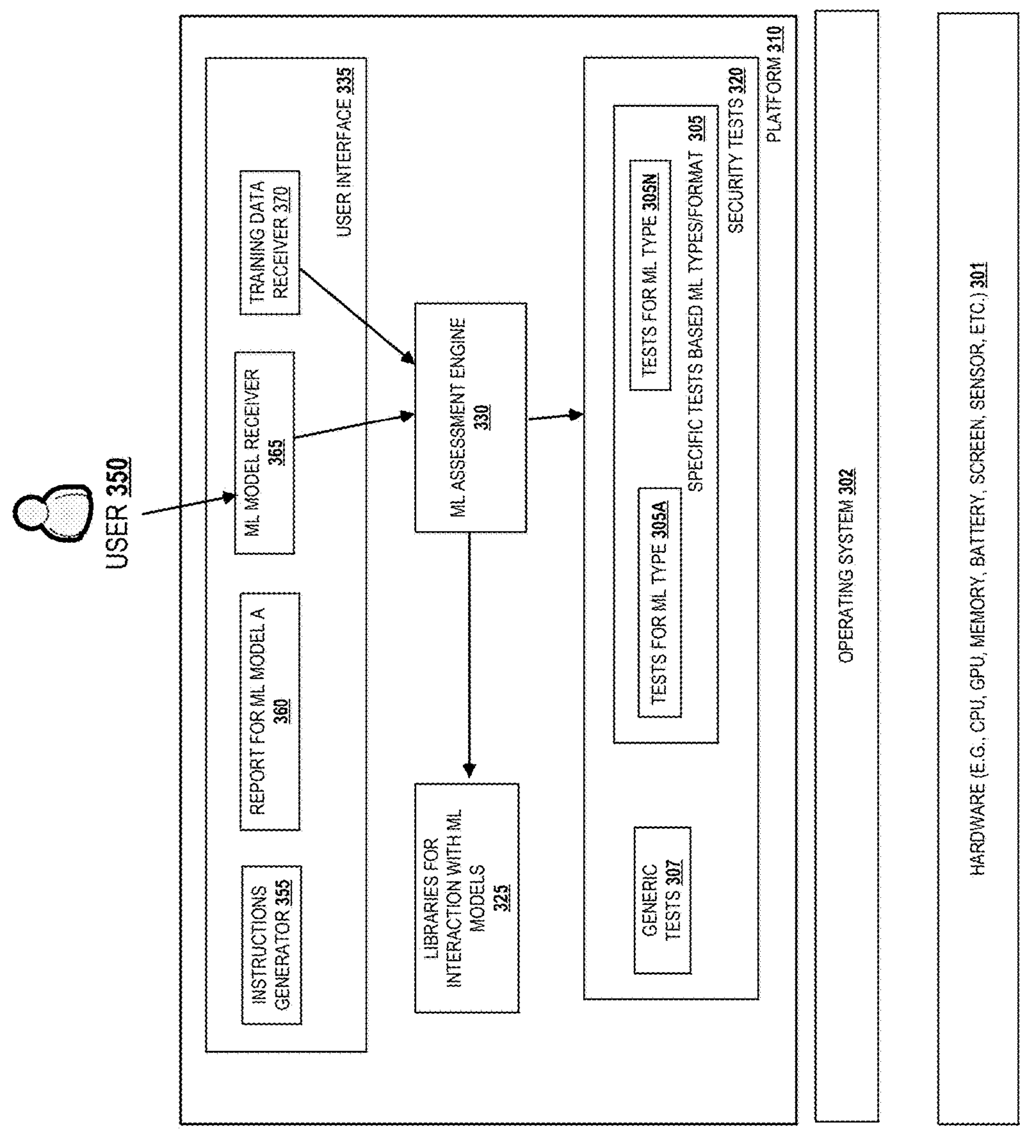
USER 350
ML MODEL RECEIVER 365
TRAINING DATA RECEIVER 370
REPORT FOR ML MODEL A 360
INSTRUCTIONS GENERATOR 355
USER INTERFACE 335
ML ASSESSMENT ENGINE 330
LIBRARIES FOR INTERACTION WITH ML MODELS 325
TESTS FOR ML TYPE 305N
TESTS FOR ML TYPE 305A
SPECIFIC TESTS BASED ML TYPES/FORMAT 305
SECURITY TESTS 320
GENERIC TESTS 307
PLATFORM 310
OPERATING SYSTEM 302
HARDWARE (E.G., CPU, GPU, MEMORY, BATTERY, SCREEN, SENSOR, ETC.) 301
300

AUTOMATED MACHINE LEARNING MODEL ASSESSMENT

TECHNICAL FIELD

The present disclosure relates to computer-implemented methods, software, and systems for data processing.

BACKGROUND

Artificial intelligence (AI) can be implemented in a variety of different data processing use cases. Machine learning (ML) models may be trained to learn from data and to generalize to unseen data so that they can support the execution of tasks without explicit instructions. ML finds application in many fields such as natural language processing, computer vision, speech recognition, image recognition, data filtering, logistics, transportation, manufacturing, and healthcare. The mathematical foundations of ML lies in mathematical optimization (mathematical programming) methods.

SUMMARY

The present disclosure involves systems, software, and computer implemented methods for automatically assessing robustness and resilience of use of ML models. Their ability to withstand adversarial attacks can be determined based on security testing tailored to the specific type and/or format of the respective ML model that is tested.

One example method may include operations such as: receiving a request to perform a security test on a first ML model, wherein the request includes a file with the first ML model; analyzing the first ML model to identify a type of the first ML model; generating applicable test cases for testing the first ML model; executing the applicable test cases to determine a model assurance score indicative of an ability of the first ML model to withstand adversarial attacks; and providing a report for display at a display device, the report including the model assurance score for the first ML model.

In some instances, analyzing the first ML model can include identifying, based on analyzing source code of the first ML model, data types of input variables of the first ML model.

In some instances, generating the applicable test cases can include identifying a set of tests for generating the applicable test cases, wherein the set of tests are identified at a test suite including tests for testing ML models of a plurality of different types.

In some instances, the type of the first ML model is indicative of a programming language and a framework used to build the ML model.

In some instances, generating the applicable test cases can include: identifying generic tests relevant for the security test; and identifying one or more specific tests relevant to the type of the first ML model.

In some instances, generating the applicable test cases can include executing a search at a test case database to identify the applicable test cases as relevant to model features of the first ML model.

In some instances, the first ML model can include a set of model features defined for the type of the first ML model.

In some instances, executing the applicable test cases can include obtaining training data for executing the applicable test cases. the training data is relevant for the type of the first ML model, wherein the training data includes training input data of an input type matching an input type of data expected by a file format used for storing the first ML model.

In some instances, the method can include identifying one or more modifications to the first ML model to be performed to adjust the model assurance score when a modified version of the first ML model is run, in response to determining the model assurance score. In some instances, instructions for modifying the first ML model as deployed at a productive environment can be generated based on the identified one or more modifications.

Similar operations and processes may be performed in a system including at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations is also contemplated. In other words, while generally described as computer implemented software embodied on tangible, non-transitory media that processes and transforms the respective data, some or all of the aspects may be computer implemented methods or included in respective systems or other devices for performing this described functionality.

It is appreciated that methods, in accordance with the present disclosure, can include any combination of the aspects and features described herein. That is, methods in accordance with the present disclosure are not limited to the combinations of aspects and features specifically described herein, but also include any combination of the aspects and features provided.

The details of these and other aspects and embodiments of the present disclosure are set forth in the accompanying drawings and the description below. Other features, objects, and advantages of the disclosure will be apparent from the description, the drawings, and the claims.

DESCRIPTION OF DRAWINGS

FIG. 3 is a block diagram of an example architecture for running an ML model assessment process.

DETAILED DESCRIPTION

Figure 1:
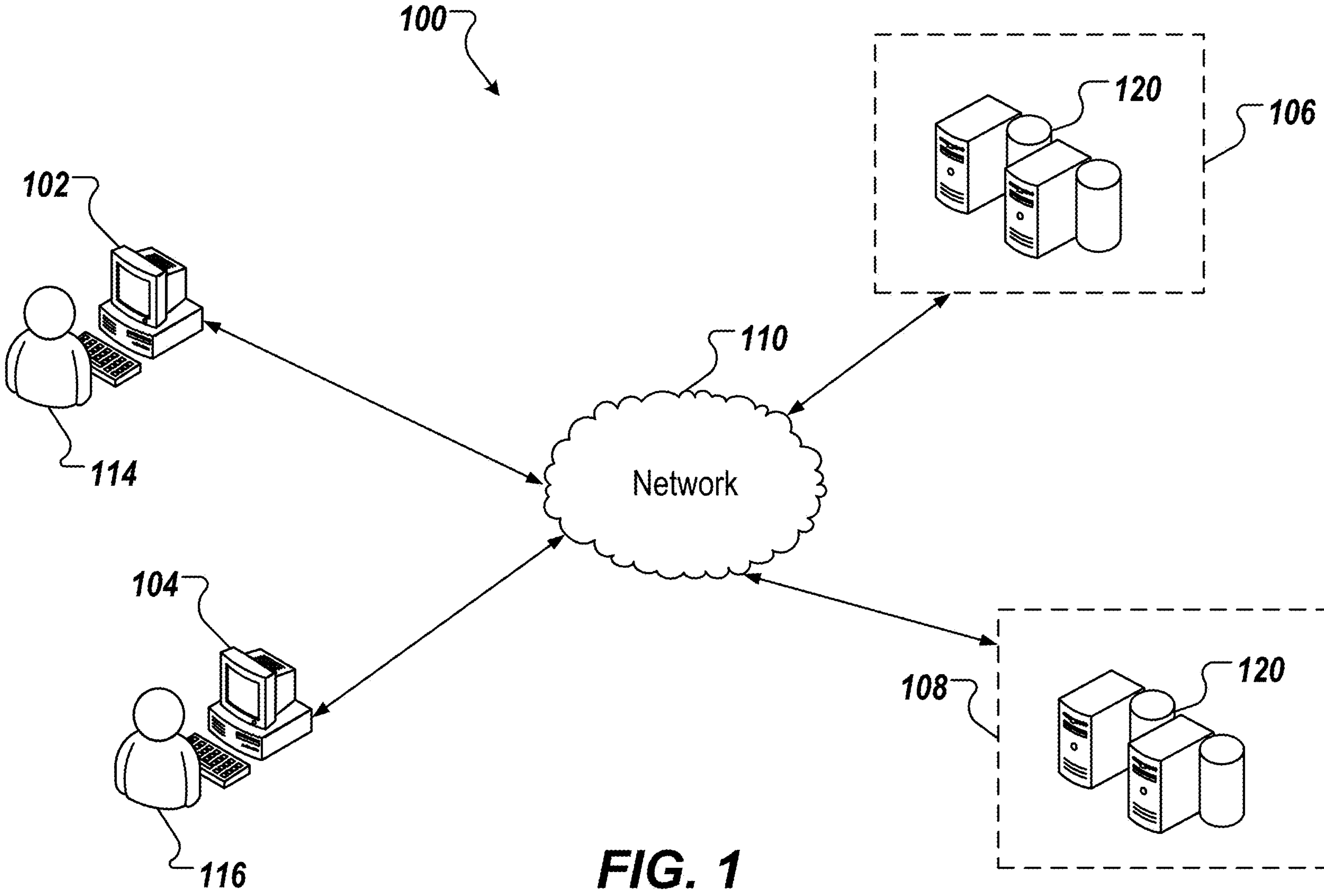
FIG. 1 illustrates an example computer system architecture for determining misfits of simulations methods.

The present disclosure describes various tools and techniques for security testing of machine learning (ML) models. The technology generally relates to automated test case generation for assessment of security risks associated with ML models. The techniques provide prompt security assessments and can guide modifications of ML models to achieve expected security levels and assure accurate and resilient results. In some implementations, the techniques can support efficient monitoring of an environment that incorporates ML techniques to automate task execution without extensive human or machine external supervision.

Nowadays, Artificial Intelligence (AI) engines and their associated ML models are widely used in software environments for executing various tasks. The use of such AI techniques is associated with risks that the underlying logic can be compromised or manipulated without authorization or can provide inaccurate results. ML models can be assessed to determine their stability and security level to withstand adversarial attacks.

Artificial Intelligence and Machine Learning techniques can be used in autonomous systems or applications to support decision making without or with very limited user intervention. The use of such techniques in automated solutions without human supervision may be associated with risks of inaccuracy and/or security breaches. In some cases, security risk assessment of used ML models can monitor or assess the performance or status of the ML models in an attempt to mitigate potential risks. The performance of such risk assessments can mitigate risks that cannot be mitigated by standard or traditional security test cases. For example, if an attacker or an intruder attempts to manipulate the logic or implementation of an ML model, the model can be corrupted and can start to provide anomalous unreliable results. For example, the attacker or intruder may use adversarial techniques to influence, modify, or otherwise compromise the execution of the ML model so that the provided output may differ from the output if no such interference had existed.

For example, a system can be designed to receive images of a pipeline and use an ML model to detect when pipes have reached a certain degree of corrosion. The images can be provided to the system by autonomous drones or other devices in the field and the ML model can be executed to provide a decision whether to instigate servicing of the pipe. The ML model that is used to monitor the pipeline's corrosion has some risk of being corrupted (attacked or not accurately functioning) and could report improperly that there is no corrosion on corroded pipes. In that case, if human checks are foregone or performed less often, there is a risk that a human check may be too late to prevent, stop, or reduce the chance of a pipe failure or other subsequent failures related to the whole pipe system. For example, if a pipe failure in an oil system is not diagnosed on time, the risk of oil leaks is increased.

In some implementations, techniques for testing an ML model are provided to determine whether the ML model can be modified to reduce the risk of malfunction of the ML model and to avoid inaccurate behavior of the model. In some implementations, the testing techniques can be designed to improve the speed and accuracy of testing the ML models by implementing security testing techniques for accurate assessment of the security level of ML models. The testing techniques can be based on considerations for the specific type of the model and respective training data. In some implementations, a solution (e.g., application, service, or platform including hardware and software) can be configured to process a ML model to automatically measure a model assurance score as a cumulative measure. The measure can be based on executing multiple tests relevant for the specific model. The solution can assess ML models of various types that are stored in different file formats.

For example, an ML model file (e.g., PYTORCH® file, JUNIPER® notes etc.) can be obtained. The file type of the ML model can be analyzed and a set of tests can be applied based on data types that are permitted as input variables of the ML model. In some examples, an ML model can be written in PYTHON® programming language using PYTORCH® as a framework for building the model. The ML model can be designed to identify images of corroded pipe valves. The ML model can be tested for accuracy when identifying corroded pipe valves as well as tested for determining a level of robustness against potential adversarial attacks that can be applied to the ML model at runtime and interfere with the ML model performance and accuracy. Different adversarial techniques can be considered to be tested for an ML model depending on the type of the ML model and type of tasks or logic that is defined for the ML model. In the example ML model identifying images of corroded pipe valves, the ML model can be assessed for robustness against adversarial techniques such as training set poisoning, model inversion attacks (e.g., to infer one or more model parameters), or direct attacks against the model code (e.g., to determine code vulnerability). Some of the test considerations can be of generic nature, while other tests can be specific to the type of the model, file format, data types, or type of the tasks.

In some implementations, an automated solution can be provided to test a received ML model based on training data. For example, available training data may be provided together with the ML model for testing. The automated testing can also provide an estimation score indicative of how robust the model is. The estimation score can be considered to be a measurement of the ability of the ML model to withstand adversarial attacks. The score can calculated based on results obtained from multiple tests applied to the ML model using the training data. In some implementations, the score can be calculated as an aggregated score based on a set of scores obtained for the ML model from running a set of tests on the model. In some implementations, the score can be calculated as a weighted average of the scores obtained from each of the test that are executed. In some cases, weight values can be assigned for different tests used to calculate the score for the model. For example, each test can be associated with a level of the risk that is assessed with that respective test. For each level, a respective weight value can be assigned.

In some implementations, the ML model security test assessment can be performed offline. By operating offline, the execution of the testing can be performed with reduced complexity by deferring integration with a security system with an operational system where the ML model is running. In some implementations, a standalone offline solution can be configured to allow testing of ML models of different type (e.g., different types of models stored in different formats using different frameworks) that is isolated from any interference with the instance of the model running in production mode.

FIG. 1 depicts an example architecture 100 in accordance with implementations of the present disclosure. In the depicted example, the example architecture 100 includes a client device 102, a client device 104, a network 110, an environment 106, and an environment 108. The environment 106 and the environment 108 may be a cloud environment. The environment 106 and the environment 108 may include one or more server devices and databases (e.g., processors, memory). In the depicted example, a user 114 interacts with the client device 102 and a user 116 interacts with the client device 104.

In some examples, the client device 102 and/or the client device 104 can communicate with the environment 106 and/or environment 108 over the network 110. The client device 102 can include any appropriate type of computing device such as a desktop computer, a laptop computer, a handheld computer, a tablet computer, a personal digital assistant (PDA), a cellular telephone, a network appliance, a camera, a smartphone, an enhanced general packet radio service (EGPRS) mobile phone, a media player, a navigation device, an email device, a game console, or an appropriate combination of any two or more of these devices, or other data processing devices. In some implementations, the network 110 can include a large computer network, such as a local area network (LAN), a wide area network (WAN), the Internet, a cellular network, a telephone network (e.g., PSTN), or an appropriate combination thereof connecting any number of communication devices, mobile computing devices, fixed computing devices and server systems.

In some implementations, the environment 106 includes at least one server and at least one data store 120. In the example of FIG. 1, the environment 106 is intended to represent various forms of servers including, but not limited to a web server, an application server, a proxy server, a network server, and/or a server pool. In general, server systems accept requests for application services and provides such services to any number of client devices (e.g., the client device 102 over the network 110) and other service requests, as appropriate.

In some implementations the environments 106 and 108 may host one or more client applications, application servers, and authorization servers to support execution of secure requests between the client applications and the application server. In some implementations the users 114 and/or 116 may access a client application through the network 110.

Figure 2:
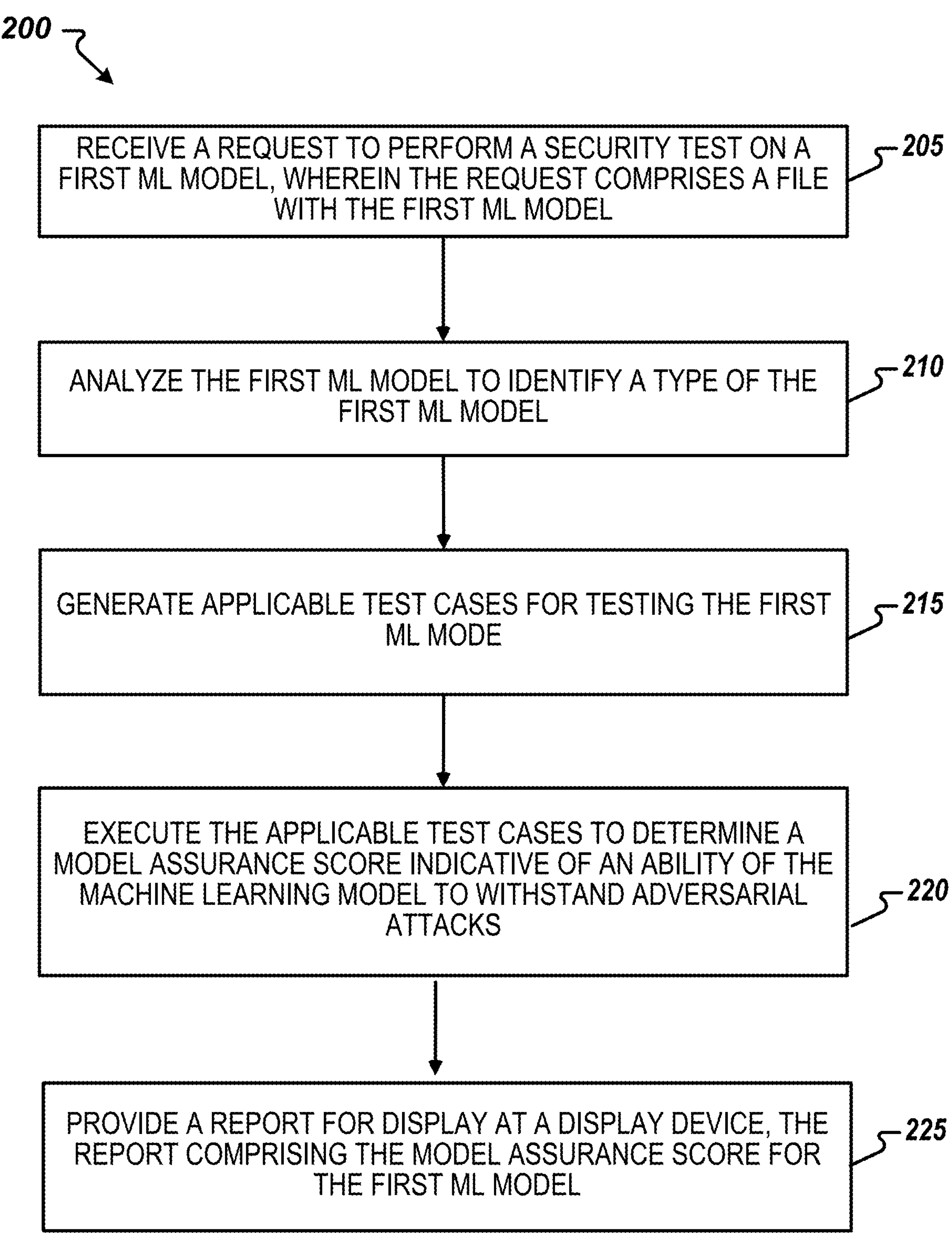
FIG. 2 is a block diagram of an example method for determining a model assurance score for a provides ML model.
Figure 4:
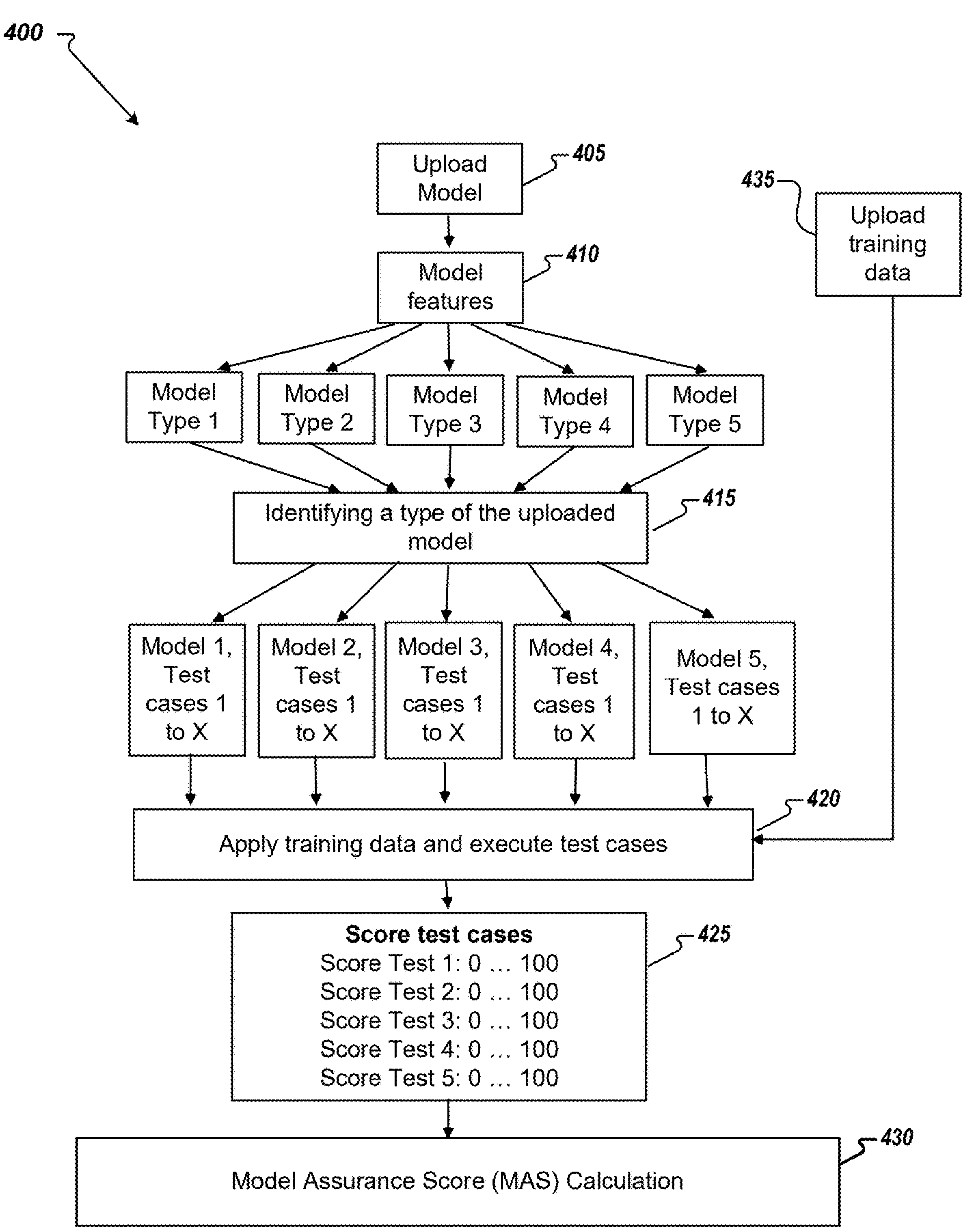
FIG. 4 is a block diagram of an example method for evaluating an ML model to determine an aggregated model assurance score by applying security tests for the ML model.

In some implementations the environment 106 and/or 108 can host logic for running security tests on provided ML models in accordance with implementations of the present disclosure, for example, as described in relation to FIGS. 2, 3, and 4.

FIG. 2 is a block diagram of an example method 200 for determining a model assurance score for a ML model. The method 200 can be executed at a computing environment, for example, the environment 106 and/or 108. The method 200 can be executed to determine whether the ML model behaves or provides output is correct. The assessment of the performance can be within a range of defined operating criteria for the model and based on obtained test data to be applied for relevant test cases. The method 200 can be executed on ML models of various types and can perform appropriate adversarial testing in an automated manner. The method can support automated adversarial test case generation to determine how robust and resilient an ML model is to attacks such as data manipulation attacks.

In some implementations, testing of ML models can be performed to mitigate risk of inaccurate behavior or security breaches that can occur during execution of the ML model in productive state (e.g., in the field). If ML models are susceptible to adversarial attacks (e.g., above an acceptable threshold level), they can expose the environment into which they are integrated to a higher risk associated with poor system performance, damage, or incidents, among others.

The ML models are computational representation of a mathematical function or algorithm that can discern patterns from data. ML models are used in a wide range of applications, such as image recognition, natural language processing, and recommendation systems. There are different types of ML models, such as, supervised learning models, unsupervised learning models, reinforcement learning models, and others. Supervised learning models learn from labeled data that includes both input features and corresponding output labels. Examples of supervised learning models include linear regression, logistic regression, support vector machines, and deep learning models like convolutional neural networks (CNNs) and recurrent neural networks (RNNs). Unsupervised learning models learn from unlabeled data by identifying patterns, structures, or relationships within the data. Examples of unsupervised learning models include clustering algorithms like k-means, hierarchical clustering, and dimensionality reduction techniques like principal component analysis (PCA) and t-distributed stochastic neighbor embedding (t-SNE). Reinforcement learning models learn from interacting with an environment to achieve a specific goal, receiving feedback in the form of rewards or penalties. Examples of reinforcement learning models include Q-learning, deep Q-networks (DQNs), and policy gradient methods.

In some implementations, a type of model that is selected for use can be based on a type of a task to be performed by the ML model or target output to be predicted. In some implementations in one system environment, multiple ML models of different types can be used to support the automation of various tasks. As such, testing of models of various types may be needed to evaluate the security risk level of the AI techniques implementations within a given environment.

At 205, a request to perform a security test on a first ML model is received. The request includes a file with the first ML model. In some implementations, the request can be received at a software application or a system. For example, the request can be received a software and hardware platform as described in FIG. 3.

At 210, the first ML model is analyzed to identify a type of the first ML model. For example, the analysis of the first ML model can be performed by an ML assessment engine such as the ML assessment engine 330 to determine a model type (e.g., supervised learning model, unsupervised learning model, reinforcement learning model, etc.). The analysis of the first ML model may be performed based on libraries that allow interactions with the type of the first ML model. In some implementations, the type of the first ML model is a consequence of the programming language (e.g., Python) and framework used to build the ML model.

At 215, applicable test cases are generated for testing the first ML model.

At 220, the applicable test cases as generated can be executed to determine a model assurance score (MAS). The MAS can indicate the ability of the model to withstand adversarial attacks. In some implementations the MAS can be calculated as described in FIG. 4.

In some implementations, training data is obtained for executing the applicable test cases. The obtained training data is relevant for the type of the first ML model. The training data includes training input data of an input type matching an input type of data expected by the file format of the first ML model.

In some implementations the training data can be used for evaluation, i.e., to identify applicable input data types for the first ML model such as images, text, video, etc., and also to identify ranges of acceptable values for those data types. Such information can be used when executing the adversarial testing and determining the robustness and resilience of the ML model. In some implementations, the results from the adversarial testing can be appended to the training data and used to determine whether the adversarial tests executed during the testing have been able to generate illegitimate data.

At 225, a report can be provided for display at a display device. For example, the display device can be a user device associated with the request 205, or at a user interface of a platform used for the testing, such as the platform 310 of FIG. 3. The report can include the MAS for the first ML model as determined based on executing the applicable test cases.

FIG. 3 is a block diagram of an example architecture 300 for running an ML model assessment process. The example architecture 300 includes a platform 310 that can include software that implements logic for executing a security risk assessment of ML models, for example, as described in relation to FIG. 2 and FIG. 4. In some implementations, the platform 310 can include hardware 301 including central processing unit(s), graphical processing unit(s), memory(s), battery(s), screen, or sensors. In some implementations, the platform 310 may run an operating system 340 to provide an environment on top of which the logic related to a security risk assessment can be executed. For example, automated firmware security logic 350 can be executed over the device operating system 302, where the automated security test assessment of ML models can include operations to generate test cases based on a type of a ML model being requested for testing, obtain training data for executing the test cases, and providing a model assurance score, for example, as described in relation to FIGS. 2 and 4.

In some implementations, the platform 310 can provide a customized software and hardware solution that automatically analyzes ML models to determine a level of assurance provided by that model, i.e., the MAS score as discussed in relation to FIG. 2. The MAS score can then be used in risk modelling of the respective ML model to determine whether any compensating controls are needed to protect the ML model and its components from adversarial attacks. In some implementations if such compensating controls are implemented on the ML model, the compensated model will have an improved MAS score indicative of stronger resistance towards adversarial attacks.

In some implementations, the platform 310 can run as a standalone system on a given operating system (e.g., Ubuntu based operating system) and be supported by GPUs provided by the underlying hardware to perform the ML processing at an ML assessment engine 330. In some implementations, the platform 310 can be provided as a cloud solution that can be provide the security testing of ML models as a cloud service.

In some implementations, a user 350 can interact with a user interface 335 (e.g., graphical user interface) exposed by the platform 310 and provide a file including the code of an ML model, such as the received ML model at 205 of FIG. 2. The ML model can be received at the ML model receiver 365 and can be provided for security assessment at the ML assessment engine 330. The ML assessment engine 330 can be configured to analyze the ML model, identify relevant tests for the type of the ML model, and generate test cases based on testing data. In some implementations, the ML assessment engine 330 can obtain the tests from a suite of security tests 320.

In some implementations, the ML assessment engine 330 can identify the type of the ML model and can perform a search at the security tests 320 to identify one or more tests applicable to the type of the ML model. In some implementations the security tests 320 can be stored in a local database at the platform 310.

The execution of the ML processing can rely on a set of libraries 325 for interacting with the ML models. For example, the libraries 325 that can be integrated into the platform 310 can include libraries that can be used to examine and report risk measurement of ML models, for example, during their application lifecycle. The libraries that can be stored as part of the libraries 325, can be updated to remove or include libraries to support more or different type of ML models. The update of the libraries can be performed as part of an update for the platform 310 or, at runtime, while analyzing a requested ML model for testing at the platform 310. In some implementations, a library relevant for a request ML model can be invoked from an external storage for the platform 310 and incorporated into the logic of the platform 310. In some implementations, the libraries 325 can be used within the code base of the ML assessment engine 330 to provide a consolidated platform for automatic testing of any model that may be provided for testing.

In some implementations, when a model is obtained for testing at the ML assessment engine 330, the model can be analyzed to identify the type of the model. For example, the type can correspond to a type of a task that is executed by the ML model. The type can be supervised learning model, unsupervised learning model, reinforcement learning model, or another. Each type can be saved in one or more formats depending on the framework or library used for creating the ML model. For example, a first ML model as described in relation to FIG. 2 can be of an unsupervised learning model that is stored at a particular file format. In general, formats for storing ML models can be divided into data prep file formats, training file formats, and model serving serialization formats.

For example, a first type of a ML model can be a model stored in a KERAS® format. The file of this format can have a particular file extension and can store the model architecture, weights, and computation graph. The format can define how to store the model. In the example of the KERAS® format, the model is saved as a directory with various files, including a metadata file that includes the graph definition. Another example of a format is PYTORCH® format, where the model is stored as a model dictionary with weights and biases and optionally other related data. Various formats for storing ML models can be supported for testing at the platform 310. The ML assessment at executed at the ML assessment engine 330 can be based on the type of the ML model that is indicative of the file format for storing the ML model.

In some implementations, based on identifying the type of the ML model (type of training and type of format), applicable tests for the ML model can be determined by the ML assessment engine 330. For example, the ML assessment engine 330 can identify one or more of the generic tests 307 as applicable for a ML model to be assessed and can identify specific tests from the specific tests 305. The identified specific tests can correspond to the type and/or format of the ML model. For example, the specific tests 305 can include tests developed for ML models in PYTORCH® format. In this example, if the ML model is in that format, then those tests can be used for the testing of the ML model.

In some implementations, the platform 310 can be configured to be adaptable to support various ML model formats so that new formats that are developed ca be incorporated into the logic of the platform, for example, by adding libraries at the libraries 325 that are relevant for interacting with such formats, by including specific tests for the formats at the specific tests 305, and by including logic in the ML assessment engine 330 to recognize such formats and identify relevant tests from the specific tests 305.

In some implementations, when the ML model format includes embedded filesystem components, the ML assessment engine can mount a resulting filesystem to the operating system 302 and execute testing against any active components of the mounted model.

When the ML assessment engine 330 analyzes the received ML model and identifies the format of the ML model, tests can be identified from the security tests 320 and test cases can be generated to replicate the behavior of the model and code format requirement. Based on the relevant tests (e.g., generic and/or specific), robustness and resilience of the tested model can be analyzed to determine a score indicative of the ability of the model to withstand adversarial attacks. The execution of the tests can also rely on training data, for example, data obtained from a training data receiver 370. In some implementations the training data can be existing training data used for training the model. The training data can be provided together with the ML model for testing or can be subsequently provided. In some implementations, the training data can be obtained from an internal storage at the platform or through a connected remote disk storage.

Measuring the robustness of an ML model can ensure that a system implementing the logic of the ML model, can run without failure when test examples are marginally different from the data in the training set. Measuring the resilience of an ML model can be associated with determining the ability of the ML model to adapt to anomalous inputs from unknown sources or reject predictions when it has low confidence.

In some implementations, the user interface 335 interact with the user 350 (or other entity such as an application or service not shown on FIG. 3) when an ML model and training data are submitted for processing at the ML assessment engine 330. The ML assessment engine 330 can initiate a test case, determine a model type based on the file type of the ML model, and determine applicable test cases to execute testing and generate a score as an output. The generated score (the MAS) can be provided as part of a report 360 for notification to the user 350. In some implementations the MAS score can be a value on a scale of 0 to 100 or can be mapped to a given risk level category based on defined ranges over the scale of 0 to 100. The calculation of the MAS score at the ML assessment engine 330 can be performed as described in relation to FIGS. 2 and 4.

Based on the computed MAS score, it can be determined whether modifications to the ML model should be performed to improve the MAS score and risk aversity. For example, if a MAS score is below a threshold value, the ML model can be evaluated to determine whether modifications can be introduced to adjust the logic of the model or the techniques for obtaining input data to make the model less prone to security breaches and adversarial attacks. In some implementations based on identified optional modifications for the ML model, instructions can be generated that are usable for modifying an ML model that is already deployed in a productive environment. In some implementations, the instructions may be usable for defining an upgrade operation for the ML model.

FIG. 4 is a block diagram of an example method 400 for evaluating an ML model to determine an aggregated model assurance score by applying security tests to the ML model.

At 405, an ML model is uploaded. For example, the ML model can be substantially the same as the first ML model described in relation to FIG. 2. For example, the ML model can be uploaded at an ML model receiver 365 of FIG. 3. The uploaded model can be evaluated to determine model features (410). The model features may depend on a format of the ML model as uploaded. For example, a first file type used for storing the ML model can include components such as model architecture, weights, states, biases, or other related data.

At 435, training data is uploaded, where the training data is relevant for the uploaded model. The training data is used for training the ML model. The training data as uploaded can be used to confirm input types for the ML model such as text, imagery, videos etc.

Based on identifying the model features at 410, the model can be identified as a respective type of an ML models. The method 400 can support various types of ML models, as described in relation to FIG. 3. Based on identifying the type of the ML model, at 415, model specific test cases can be determined. The model specific test cases can be based on generic tests or specifics tests, as described in relation to FIG. 3.

In some implementations, ML assessment logic can be configured to interact with the ML model, for example, based on using available libraries such as the libraries 325 of FIG. 3. The ML assessment logic can be executed to determine which adversarial test cases are relevant to the ML model. At 420, identified applicable test cases can be executed by applying the obtained training data. The identification and execution of such security testing can be performed automatically. Scores from each executed test case can be obtained at 425. For example, for each executed test, a score on the scale between 0 to 100 can be obtained. The score can identify how robust and reliable the model is for withstanding different types of adversarial attacks. At 430, a model assurance score (MAS) is calculated. For example, the MAS can be calculated as described in relation to operation 220 of FIG. 2.

In some implementations the MAS score can be calculated as a percentage of the sum of all generated adversarial test cases. For example, the MAS score can be calculated according to the below formula:

$$MAS = \left((sMTxTC1 + sMTxTC2 + sMTxTC3 + \ldots + sMTxTCy)/MaxScore\right) * 100$$

In some implementations, the MAS can be considered an approximation of the level of risk a particular model has with regard to adversarial test cases. In other words, the MAS score can be indicative of the likelihood that a model is susceptible to fraudulent attack. In some cases, the MAS score can be calculated based on applying weight to each of the scores obtained from the execution of each of the tests. For example, higher weight values can be assigned to test cases that are more important to the functioning of the model.

In some implementations, the MAS score can be evaluated based on boundary conditions that can be defined for the particular model. For example, the boundary conditions can define one or more ranges to classify the calculated MAS score. For example, the boundary conditions can be tailored to a determined risk level associated with the use of the model and/or the executed tasks. For example, a model that is deployed in an internal infrastructure of an organization with limited or restricted external use access can be defined as associated with a low risk level (e.g., on a scale for evaluating the risk level) compared to a model that directly interfaces with external parties and obtains input data. In some implementations, models can be associated with categories corresponding to their risk level, where each category can be mapped to respective boundary conditions. In some implementations, the boundary conditions can define ranges of MAS score values on the scale (e.g., between 0 to 100) to categorize the value and to determine if there can be modifications done to the model to improve the MAS score. In some implementations, the boundary conditions for a given set of models corresponding to a given risk level can include a threshold value. If a MAS score is above the threshold value, then the model is associated with a lower likelihood of being tampered with by malicious entities and can be maintained for executing in productive environment "as is" without modifications. In some implementations, boundary conditions defined for models that are associated with higher risk levels can define a higher pass rate for categorizing a model as associated with a lower likelihood of being tampered with by malicious entities. For example, a very important or high risk model may be associated with a MAS threshold value of a 95% to categorize the model as secure, whereas a less important model may be considered as secure with a MAS score of as low as 85%.

Based on the executed assessment, the score calculation and the evaluation of the score to determine whether the model is with lower likelihood of being tampered with, a final report can be generated that can include test results from the various tests executed at 425. The report can include also recommendation for improving the adversarial security or the robustness of the model.

Figure 5:
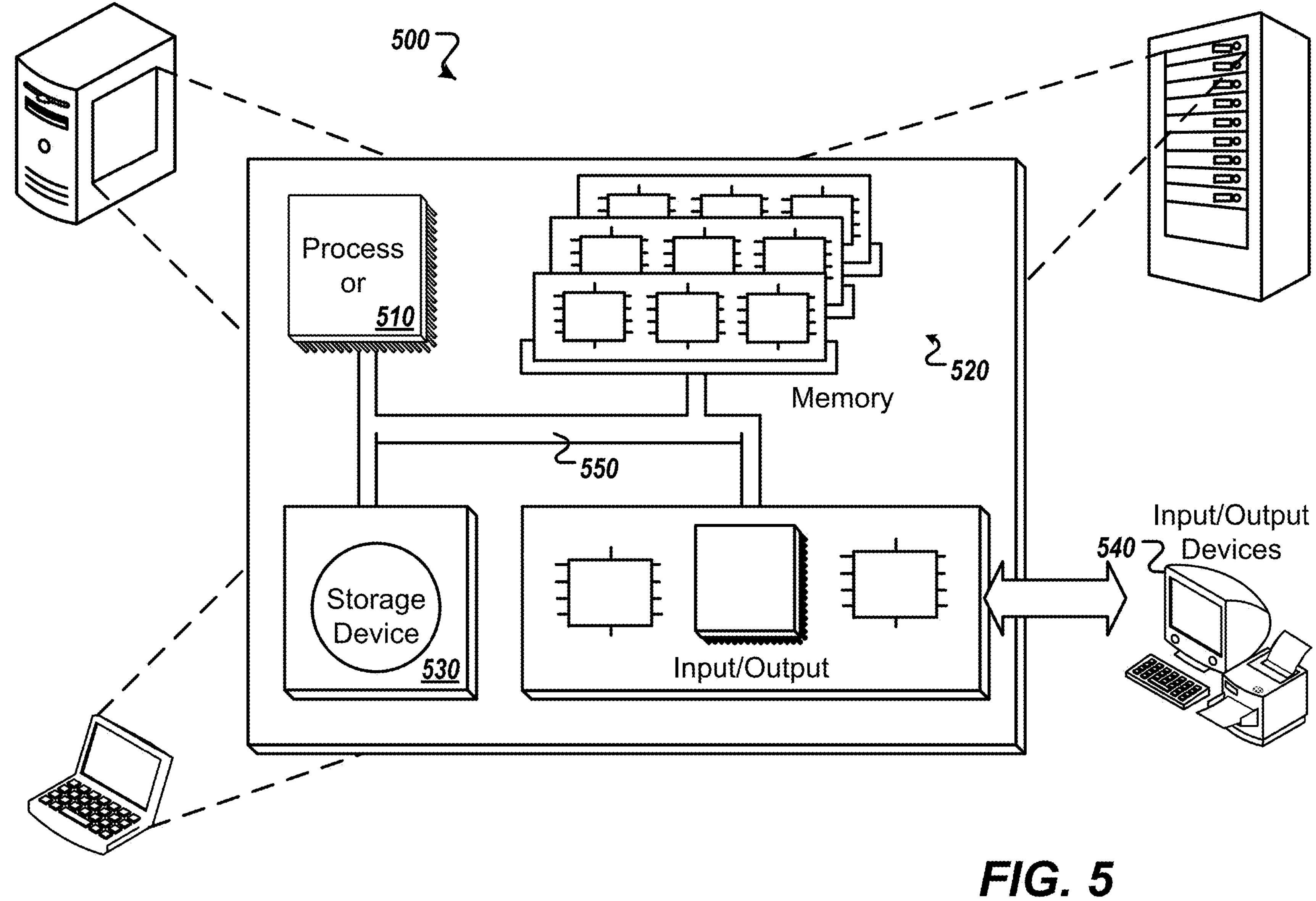
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, and 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system, including at least one programmable processor coupled to receive data and instructions from, and to transmit data and instructions to a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory, a random access memory, or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated into application-specific integrated circuits (ASICs).

To provide for interaction with a user, the features can be implemented on a computer having a display device, such as a cathode ray tube (CRT) or liquid crystal display (LCD) monitor for displaying information to the user and a keyboard and a pointing device, such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication, such as a communication network. Examples of communication networks include, for example, a LAN, a WAN, and the computers and networks forming the Internet.

The computer system can include clients and servers. A client and server are generally remote from each other and typically interact through a network, such as the described one. The relationship of the client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of the subject matter, this application discloses the following list of examples, wherein one feature of an example in isolation or more than one feature of said example taken in combination and, optionally, in combination with one or more features of one or more further examples are further examples also falling within the disclosure of this application.

What is claimed is:

1. A computer-implemented method for security testing of machine learning (ML) models, the method comprising:
 receiving a request to perform a security test on a first ML model, wherein the request comprises a file with the first ML model;
 analyzing the first ML model to identify a type of the first ML model;
 generating applicable test cases for testing the first ML model;
 executing the applicable test cases to determine a model assurance score indicative of an ability of the first ML model to withstand adversarial attacks; and
 providing a report for display at a display device, the report comprising the model assurance score for the first ML model.

2. The method of claim 1, wherein analyzing the first ML model comprises:
 identifying, based on analyzing source code of the first ML model, data types of input variables of the first ML model.

3. The method of claim 1, wherein generating the applicable test cases comprises:
 identifying a set of tests for generating the applicable test cases, wherein the set of tests are identified at a test suite comprising tests for testing ML models of a plurality of different types.

4. The method of claim 1, wherein the type of the first ML model is indicative of a programming language and a framework used to build the ML model.

5. The method of claim 1, wherein generating the applicable test cases comprises:
 identifying generic tests relevant for the security test; and
 identifying one or more specific tests relevant to the type of the first ML model.

6. The method of claim 1, wherein generating the applicable test cases comprises executing a search at a test case database to identify the applicable test cases as relevant to model features of the first ML model.

7. The method of claim 1, wherein the first ML model includes a set of model features defined for the type of the first ML model.

8. The method of claim 1, wherein executing the applicable test cases comprises:
 obtaining training data for executing the applicable test cases, where the training data is relevant for the type of the first ML model, wherein the training data includes training input data of an input type matching an input type of data expected by a file format used for storing the first ML model.

9. The method of claim 1, comprising:
 in response to determining the model assurance score, identifying one or more modifications to the first ML model to be performed to adjust the model assurance score when a modified version of the first ML model is run; and
 generating instructions for modifying the first ML model as deployed at a productive environment based on the identified one or more modifications.

10. A non-transitory computer-readable medium coupled to one or more processors and having instructions stored thereon which, when executed by the one or more processors, cause the one or more processors to perform operations, the operations comprising:
 receiving a request to perform a security test on a first ML model, wherein the request comprises a file with the first ML model;
 analyzing the first ML model to identify a type of the first ML model;
 generating applicable test cases for testing the first ML model;
 executing the applicable test cases to determine a model assurance score indicative of an ability of the first ML model to withstand adversarial attacks; and
 providing a report for display at a display device, the report comprising the model assurance score for the first ML model.

11. The non-transitory computer-readable medium of claim 10, wherein analyzing the first ML model comprises:
 identifying, based on analyzing source code of the first ML model, data types of input variables of the first ML model.

12. The non-transitory computer-readable medium of claim 10, wherein generating the applicable test cases comprises:
 identifying a set of tests for generating the applicable test cases, wherein the set of tests are identified at a test suite comprising tests for testing ML models of a plurality of different types.

13. The non-transitory computer-readable medium of claim 10, wherein the type of the first ML model is indicative of a programming language and a framework used to build the ML model.

14. The non-transitory computer-readable medium of claim 10, wherein generating the applicable test cases comprises:
 identifying generic tests relevant for the security test; and
 identifying one or more specific tests relevant to the type of the first ML model.

15. The non-transitory computer-readable medium of claim 10, wherein generating the applicable test cases comprises executing a search at a test case database to identify the applicable test cases as relevant to model features of the first ML model.

16. The non-transitory computer-readable medium of claim 10, wherein the first ML model includes a set of model features defined for the type of the first ML model.

17. A system comprising:
 a computing device; and
 a computer-readable storage device coupled to the computing device and having instructions stored thereon which, when executed by the computing device, cause the computing device to perform operations, the operations comprising:
  receiving a request to perform a security test on a first ML model, wherein the request comprises a file with the first ML model;
  analyzing the first ML model to identify a type of the first ML model;

generating applicable test cases for testing the first ML model;

executing the applicable test cases to determine a model assurance score indicative of an ability of the first ML model to withstand adversarial attacks; and providing a report for display at a display device, the report comprising the model assurance score for the first ML model.

18. The system of claim 17, wherein analyzing the first ML model comprises:

identifying, based on analyzing source code of the first ML model, data types of input variables of the first ML model.

19. The system of claim 17, wherein generating the applicable test cases comprises:

identifying a set of tests for generating the applicable test cases, wherein the set of tests are identified at a test suite comprising tests for testing ML models of a plurality of different types.

20. The system of claim 17, wherein the type of the first ML model is indicative of a programming language and a framework used to build the ML model.

* * * * *